(12) United States Patent
Goergen et al.

(10) Patent No.: US 11,858,458 B2
(45) Date of Patent: Jan. 2, 2024

(54) LOCKING FASTENER ASSEMBLY WITH AUTHENTICATION BASED UNLOCKING

(71) Applicant: CISCO TECHNOLOGY, INC., San Jose, CA (US)

(72) Inventors: Joel Richard Goergen, Soulsbyville, CA (US); Mary Kathryn Savage, Hoover, AL (US); Kameron Rose Hurst, Sonora, CA (US); Robert Gregory Twiss, Chapel Hill, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 589 days.

(21) Appl. No.: 17/118,197

(22) Filed: Dec. 10, 2020

(65) Prior Publication Data
US 2022/0048467 A1 Feb. 17, 2022

Related U.S. Application Data

(60) Provisional application No. 63/066,453, filed on Aug. 17, 2020.

(51) Int. Cl.
B60R 25/20 (2013.01)
G06F 21/88 (2013.01)
F16B 39/04 (2006.01)
B60R 25/01 (2013.01)
G07C 9/00 (2020.01)

(52) U.S. Cl.
CPC ............. B60R 25/20 (2013.01); B60R 25/01 (2013.01); F16B 39/04 (2013.01); G06F 21/88 (2013.01); G07C 9/00571 (2013.01)

(58) Field of Classification Search
None
See application file for complete search history.

(56) References Cited

U.S. PATENT DOCUMENTS

| 9,483,674 B1 | 11/2016 | Fink | |
| 2010/0054891 A1* | 3/2010 | Nishida | B25B 23/14 73/761 |
| 2015/0338891 A1 | 11/2015 | Cain, III | |
| 2017/0016469 A1 | 1/2017 | Zhu | |
| 2019/0244454 A1 | 8/2019 | Feltham | |
| 2020/0293850 A1 | 9/2020 | Grove | |

* cited by examiner

Primary Examiner — K. Wong

(57) ABSTRACT

In one embodiment, an apparatus includes a first member, a second member configured for coupling with the first member, an authentication module integrated into one of the first or second member, and a locking device operable to lock the second member to the first member, and unlock the second member from the first member upon receiving input from the authentication module. The authentication module is operable to authenticate an unlock request received from an external source.

36 Claims, 18 Drawing Sheets

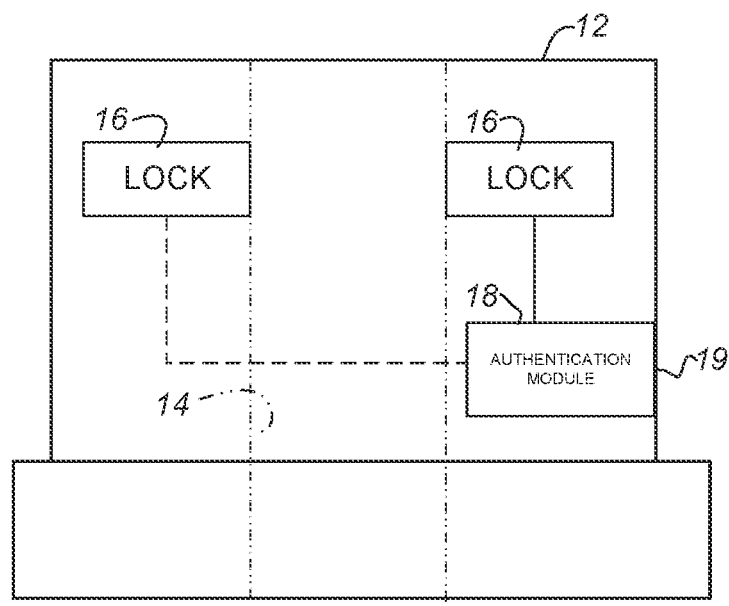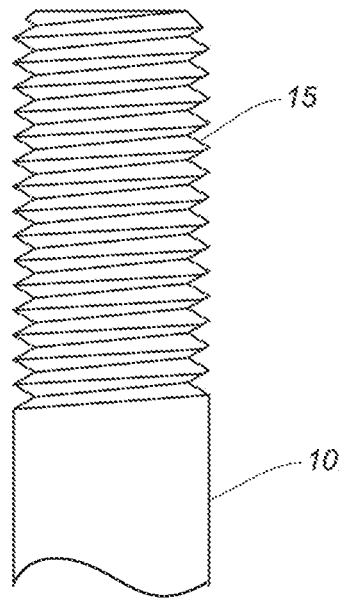
FIGURE 1

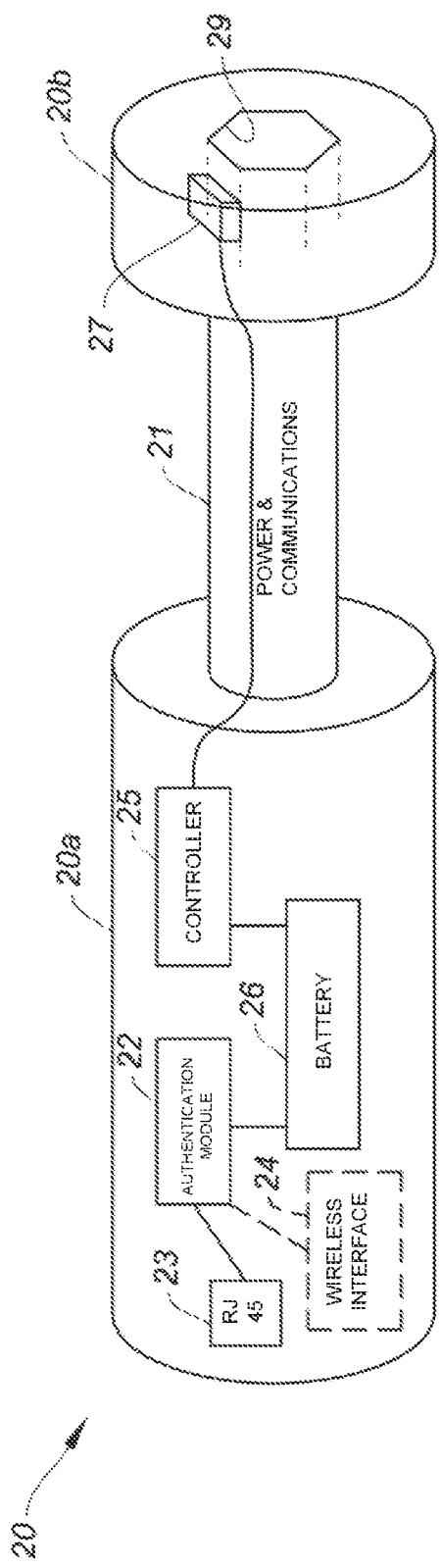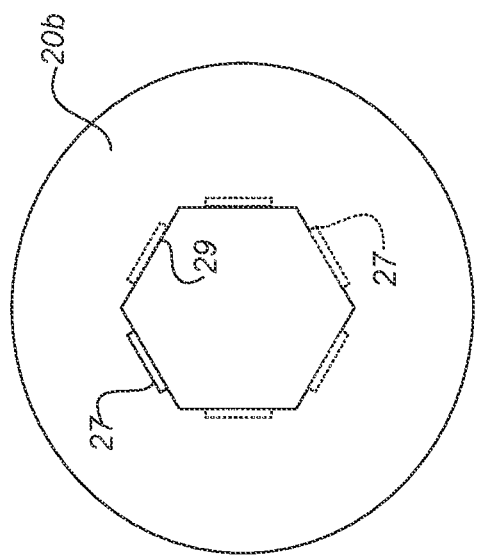

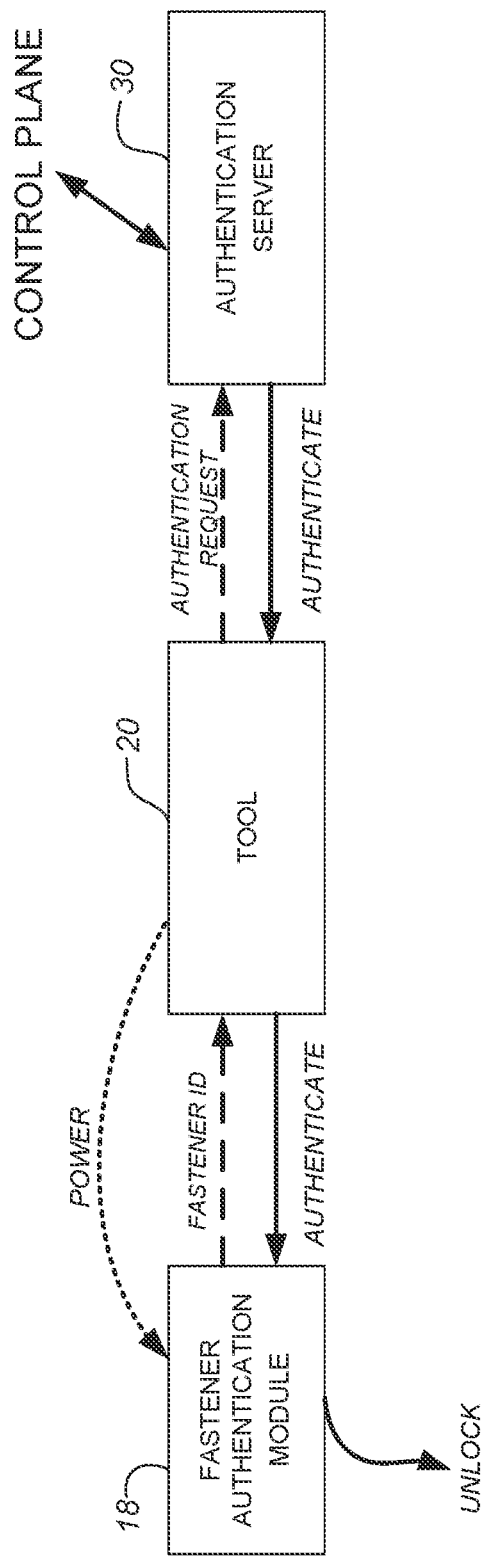

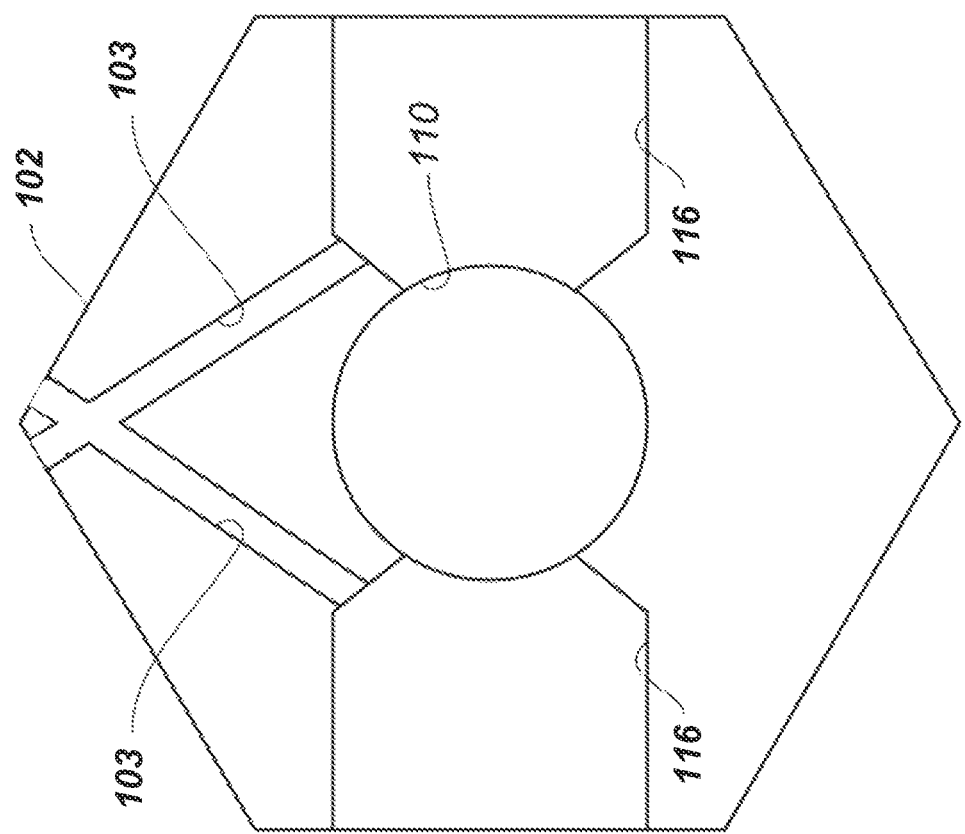
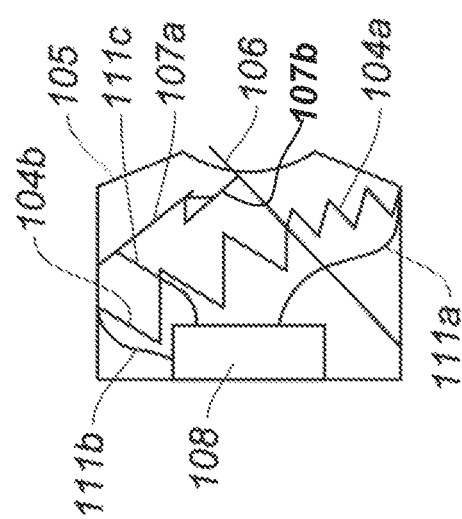
FIGURE 10

LOCKING FASTENER ASSEMBLY WITH AUTHENTICATION BASED UNLOCKING

STATEMENT OF RELATED APPLICATION

The present application claims priority from U.S. Provisional Application No. 63/066,453 entitled INTEGRATION OF A TRUST MODULE INTO A FASTENER FOR SECURE LOCKING, filed on Aug. 17, 2020, the contents of which are incorporated herein in its entirety.

TECHNICAL FIELD

The present disclosure relates generally to mechanical fasteners, and more particularly, to locking fasteners with electronically controlled unlocking.

BACKGROUND

There are many types of mechanical fasteners or latch assemblies that may be used to connect network equipment to a frame such as a rack, cabinet, or other structure. However, the network equipment can easily be removed by anyone with access to the equipment.

BRIEF DESCRIPTION OF THE FIGURES

FIG. 1 is a front view of a mechanical fastener assembly with an electronic authentication module integrated in a nut, in accordance with one embodiment.

FIG. 2A is a side perspective of a tool that may be used to unlock the fastener assembly shown in FIG. 1, in accordance with one embodiment.

FIG. 2B is an end view of the tool of FIG. 2A.

FIG. 3 illustrates an overview of a flow for power application, authentication, and unlocking of the fastener assembly shown in FIG. 1 with the tool shown in FIG. 2A, in accordance with one embodiment.

FIG. 10 is a cross-sectional view of a nut taken along line 10-10 of FIG. 4 and a control assembly with a dual spring locking device and movement sensor, in accordance with one embodiment.

Corresponding reference characters indicate corresponding parts throughout the several views of the drawings.

DESCRIPTION OF EXAMPLE EMBODIMENTS

Overview

Figure 4:
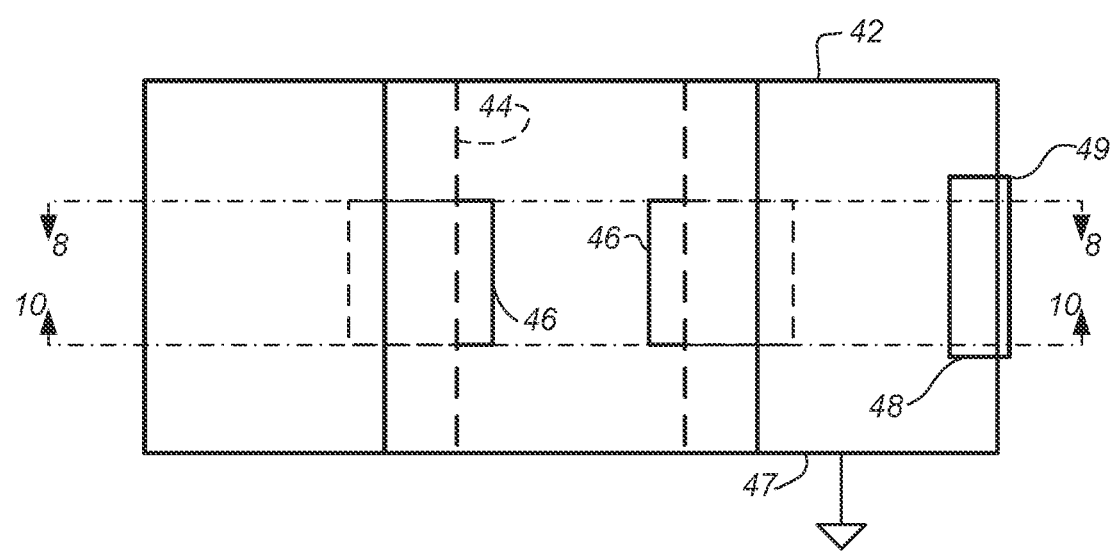
FIG. 4 is a schematic side view of a nut of the fastener assembly of FIG. 1, in accordance with one embodiment.

In one embodiment, an apparatus generally comprises an opening for receiving a fastener, a locking device operable to engage with the fastener to prevent uncoupling of the apparatus and the fastener, and an authentication module in communication with the locking device and operable to disengage the locking device from the fastener upon receiving power and authenticating a request to uncouple the apparatus and fastener.

In one embodiment, an apparatus generally comprises a first member, a second member configured for coupling with the first member, an authentication module integrated into one of the first or second member, and a locking device operable to lock the second member to the first member, and unlock the second member from the first member upon receiving input from the authentication module. The authentication module is operable to authenticate an unlock request received from an external source.

In yet another embodiment, a method generally comprises engaging a locking device to lock a fastener assembly, receiving power and communications at an authentication module integrated into the fastener assembly, authenticating a request to unlock the fastener assembly at the authentication module, and disengaging the locking device to unlock the fastener assembly.

Further understanding of the features and advantages of the embodiments described herein may be realized by reference to the remaining portions of the specification and the attached drawings.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

In many network implementations, there is a need for securely locking network equipment or components (e.g., server blade, digital communications components, Wi-Fi module, cellular module, router, switch, platform components, power components, cards (line cards, fabric cards, memory cards and the like) or other devices, elements, components, or systems) in a data center, mobile data center installed in an electric vehicle, or other networking environment.

The embodiments described herein integrate an authentication module (e.g., Trust Anchor (Authentication) Module (TAM) device (e.g., chip)) in a mechanical fastener assembly (e.g., fastener (stud, bolt, screw, pin) and nut or other threaded or unthreaded structure with an opening for receiving the fastener) comprising a locking device (e.g., one or more locking members and control elements) operable to engage (e.g., compress against) a mating fastener element (e.g., external threads of fastener, groove in pin, internal threads of nut) thereby locking the fastener assembly and preventing removal of the equipment without authorization (authentication code, encryption key). In order to unlock the fastener assembly (e.g., remove nut from fastener), the authentication module, which may be powered by various powering means, first verifies authentication, thereby confirming that removal by a user or tool is authorized.

The fastener assembly may be coupled (e.g., nut tightened on stud manually or with a tool) without power. For example, the locking device may be in a locked (engaged) position, but still allow free movement (rotation, sliding movement) between components of the fastener assembly in a direction that couples (or tightens) the fastener. Once the locking device is engaged, the fastener assembly cannot be uncoupled (e.g., nut removed) until power is applied and authentication is performed at the authentication module. Since the equipment can only be removed with proper authentication, the embodiments may eliminate the need for tamper tabs or tape. In one or more embodiments, if the fastener assembly is tampered with, the system may recognize a lack of authentication and send a signal to issue an alarm (e.g., call 911 or other notification or action, which may be user defined). As described in detail below, the authentication module may drive a FET (Field-Effect Transistor) circuit that transmits current to a Nitinol element (spring, wire, blade), electromechanical plunger, piezo-electric cell, or other mechanism that disengages the locking device, thereby allowing the nut to be easily removed from the fastener.

The system may be used in card latching security, for bolting platforms, or any other application for securing products with a permission based access system. The system described herein may be used, for example, to secure network equipment or components in a data center, residential application, enterprise application, central office environment, electric vehicle, or other networking environment. In one example, an electric vehicle may comprise components of a mobile data center including one or more server blades, router, security or communications module, or power components, which need to be securely locked in place to prevent removal or tampering by unauthorized personnel. As described below, the fastener assembly with integrated authentication module provides improved security to prevent unauthorized access to or removal of network components from an unprotected location.

Referring now to the drawings, and first to FIG. 1, a locking fastener assembly (10, 12) with integrated authentication module 18 is shown in accordance with one embodiment. In one embodiment, an apparatus 12 (e.g., nut, hex nut, lock nut, torque nut, mounting structure) comprises an opening 14 for receiving a fastener 10 (stud, threaded member, non-threaded member, bolt, screw (cap screw, set screw), headless fastener, pin), a locking device (locking members 16 (blade, spring, wire, electric spring, electric tension spring, Nitinol wire, Nitinol blade, electrical circuit, switch)) operable to engage with the fastener to prevent uncoupling of the apparatus and fastener, and the authentication module 18 in communication with the locking device 16 and operable to disengage the locking device from the fastener upon receiving power and authenticating a request to uncouple the apparatus and fastener.

Figure 14:
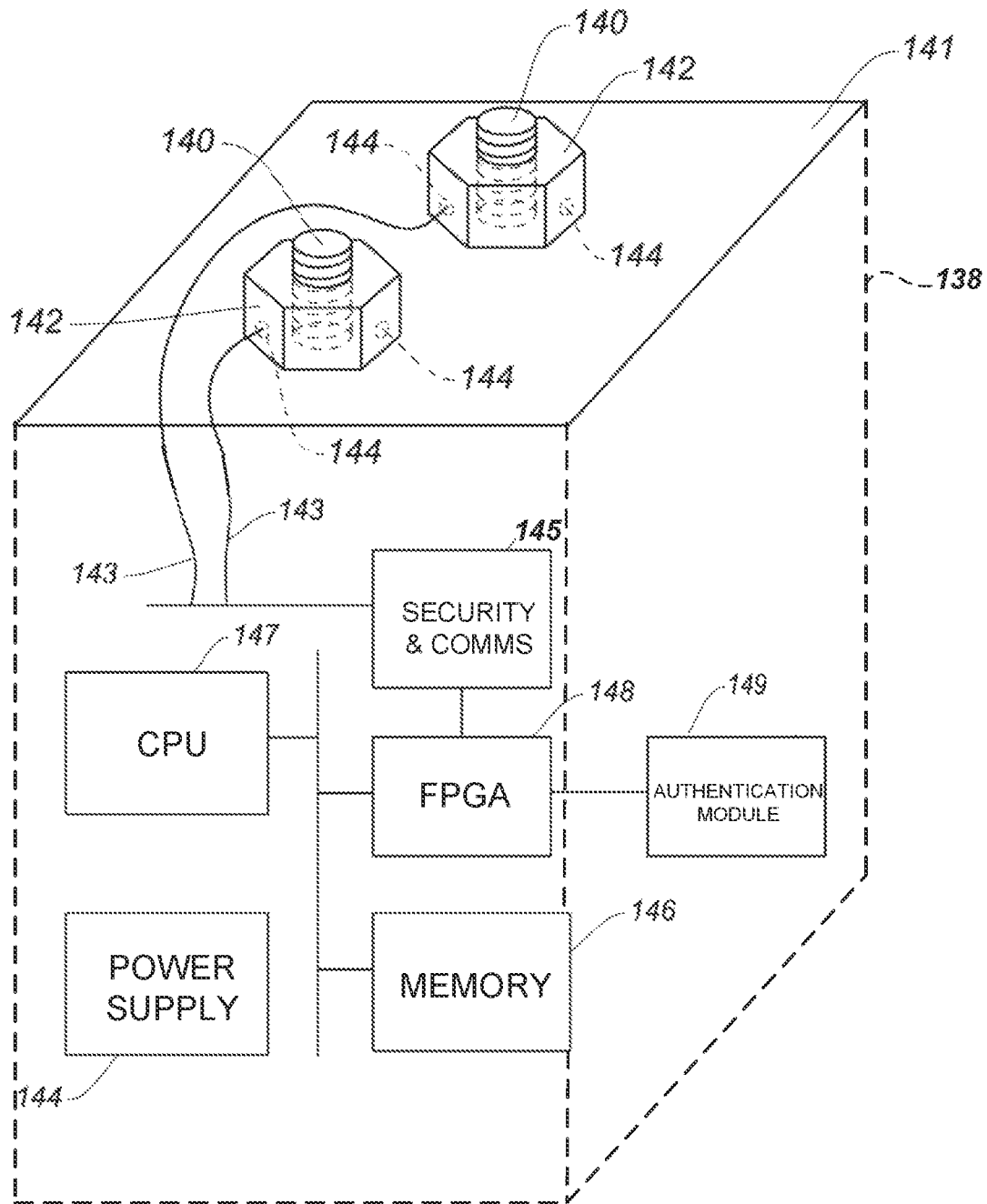
FIG. 14 is a perspective illustrating two locked fastener assemblies with the direct contact controlled authentication module and locking device of FIG. 13 in contact with a power and security system shown in a block diagram.

In one embodiment, an apparatus comprises a first member (e.g., fastener 10), a second member (e.g., nut, receiving member 12) configured for coupling with the first member, the authentication module 18 integrated into one of the first or second members, and the locking device (locking members) 16 operable to lock the second member to the first member, and unlock the second member from the first member upon receiving an input from the authentication module (e.g., signal to open FET to apply current to an element of the locking device). The authentication module 18 is operable to authenticate an unlock request received from an external source (e.g., tool described below with respect to FIG. 2A, wireless device described below with respect to FIG. 12, or system coupled to a mounting surface as shown in FIG. 14). Movement in a coupling direction (rotation (FIG. 1), longitudinal sliding motion (FIG. 15)) between the first and second members is permitted with the locking device in a locked position and movement in an uncoupling direction is permitted only with the locking device in an unlocked position.

The locking device may comprise, for example, at least two locking members 16 (or any other number of locking members) in communication with the authentication module 18. The locking device may also comprise one locking member (e.g., extending circumferentially around at least a portion of the internal opening of the nut and operable to expand inward (e.g., into a groove) to lock the fastener in place).

In the example shown in FIG. 1, the fastener comprises a stud 10 (or other externally threaded component (e.g., bolt, screw) configured for being received in the internally threaded longitudinal opening 14 in the nut 12. The fastener 10 may comprise, for example, a stud integrated into or connected to a structure or device or bolt inserted through an opening in a frame or mounting bracket. Internal threads formed on a wall of opening 14 mate with external threads 15 on the stud 10. The stud 10 and nut 12 may be configured with any type of thread having any pitch, diameter, or length on a shaft of the stud. The authentication module 18 is coupled to a power and communications interface (external contact area) 19 operable to receive power and communications (data) from an external source. In the example shown in FIG. 1, the contact area (power and communications interface) 19 is positioned along one side of the nut but may also be positioned in other locations (e.g., face (bottom surface) of the nut as described below with respect to FIGS.

13 and 14). The power and communications interface 19 shown in FIG. 1 is positioned on the side of the nut 12 for contact with a mating interface on a tool configured to unlock the fastener by providing power and an authentication code to the authentication module 18 through the power and communications interface 19, as described below with respect to FIGS. 2A and 2B.

The authentication module 18 controls the locking members 16 (e.g., spring and blade mechanism described below). The nut 12 may have an elongated body to accommodate the authentication module 18 and locking members 16. The nut 12 is configured to freely spin (rotate) onto the stud 10 without power applied but can only be removed with power and proper authentication. Without power applied, the nut 12 is automatically locked on the stud 10 and may only be removed when energized upon verification (approval) of an authentication request from an external source (tool, security system).

It is to be understood that the fastener assembly (stud 10, nut 12) shown in FIG. 1 is only an example and changes may be made to the size, shape, or type of fastener without departing from the scope of the embodiments. For example, the authentication module and lock may be integrated into the fastener rather than the nut, as described below with respect to FIG. 17. Also, the fastener may comprise a non-threaded fastener as described below with respect to FIG. 15. The term 'fastener assembly' as used herein may refer to any mechanical fastener (e.g., nut/stud, nut/bolt, screw/threaded insert or structure, pin/sleeve, and the like). The authentication module 18 is integrated into the fastener assembly (e.g., nut or fastener) to prevent uncoupling of the fastener assembly (e.g., removal of nut from stud) without receiving a proper authentication code.

FIG. 2A is a side perspective of a tool (nut driver, socket wrench) that may be used to unlock and remove the nut 12 from the stud 10 shown in FIG. 1. The tool 20 comprises an authentication module 22 (e.g., TAM chip) configured to communicate with the authentication module 18 integrated in the fastener assembly (FIGS. 1 and 2A). In the example shown in FIG. 1, a handle 20a comprises a communications port, the tool authentication module 22, a controller 25, and battery 26. The communications port may comprise, for example, an RJ45 connector 23 or other port for communications with a PoE port from a Powered Device (PD) using a hardwired connection, or a wireless interface 24 (e.g., Bluetooth, Wi-Fi). The controller 25 is coupled to a power and communications interface 27 at a driver head 20b located on one or more internal surfaces of a socket opening 29 configured to receive the nut 12 (FIGS. 1 and 2A). The power and communications interface 27 at the nut driver 20 contacts the power and communications contact point (interface) 19 on the external surface of the nut 12, thereby providing power and communications to the nut. As shown in an end view of the driver head 20b in FIG. 2B, one or more internal surfaces of the opening 29 may comprise the power and communications interface 27 so that the tool 20 may be placed over the nut 12 in more than one orientation while still providing contact between the power and communications interface 27 on the tool 20 and the power and communications interface 19 on the nut 12. The wired interface 23 or wireless interface 24 may be used to program the authentication module 22 and remove the nut 12 with the proper authentication key or code received from an authentication server, as described below with respect to FIG. 3. The tool 20 may, for example, connect to an operating system in order to receive proper authentication codes through Wi-Fi, Bluetooth, or hardwire.

It is to be understood that the tool 20 shown in FIG. 2A is only one example of a means for unlocking and removing the nut 12 from the stud 10 shown in FIG. 1. The tool 20 may also be used to remove a fastener with integrated authentication module, as described below with respect to FIG. 17 through contact with a fastener head. In one or more embodiments, power and authentication codes may be transmitted to the authentication module 18 at the nut 12 separately from the tool, in which case a standard wrench may be used to remove the nut after the authentication code (verification) is received at the nut.

FIG. 3 illustrates an overview of a process flow for authentication between the fastener assembly (e.g., nut 12) and tool 20 shown in FIGS. 1 and 2A. Power is transmitted to the fastener authentication module 18 at the power and communication interface 19 from the tool 20 (e.g., battery 26) (FIGS. 1, 2A, and 3). The tool 20 communicates with an authentication server 30 (e.g., through wired or wireless communication), which may be in communication with a network or network device over a control plane. For example, the authentication server 30 may receive one or more encrypted keys associated with the fastener assembly for use in authenticating the tool 20. Upon receiving power, the fastener authentication module 18 may transmit a fastener identifier (or other communications) to the tool 20 for use by the tool in requesting authentication at the authentication server 30. The tool 20 communicates with the authentication server 30 to obtain proper authentication keys or codes (e.g., through Wi-Fi, Bluetooth, or wired connection). Authentication may include, for example, an operating system verifying the tool 20, verifying the nut 12 in physical contact with tool, and granting permission to the tool. The server 30 authenticates the tool 20 for use in removing the nut 12 and the authentication module 22 at the tool communicates with the authentication module 18 at the nut 12, which unlocks the nut to allow for removal of the nut with the tool. The authentication modules 18, 22 and authentication server 30 may be preprogrammed with one or more encryption keys or codes. Upon verifying authorization of the tool 20 to unlock the fastener, the authentication module 18 sends a signal to unlock the locking device at the fastener assembly to allow for removal of the nut from the fastener. It is to be understood that the process flow shown in FIG. 3 is only an example and other types of authentication may be implemented using any suitable authentication protocol.

FIG. 4 is a side view of a nut 42 comprising authentication module 48 and locking device (members) 46, in accordance with one embodiment. Internal threads (opening) 44 are shown in phantom. A power and communications interface 49 is shown along an external surface on a side of the nut 42 for transmitting power and communications (data) to the authentication module 48 from a tool, as previously described. As described above with respect to FIG. 1, the authentication module 48 sends a signal to the locking device 46 to unlock the fastener assembly. For simplification, a connection between the authentication module 48 and locking members 46 are not shown. In this example, an external metal surface contact along face 47 of the nut 42 provides a ground point.

The locking device comprises blades 46 positioned for engagement with threads of the threaded member 10 with the locking device in a locked position to prevent rotation of the fastener or the nut 42 in a direction that uncouples the fastener and nut (FIGS. 1 and 4). The locking members (blades) 46 are positioned to extend from the opening 44 of the nut 42 in their locked position to wipe or cut against the external threads of the stud, thereby preventing removal of the nut 42. Cross-sectional views taken through lines 8-8 and 10-10 are shown in FIGS. 8, 10, 11, 12, and 13 to illustrate details of different locking systems.

In one or more embodiments, one or more components of the locking device (e.g., blade 46 or spring configured to move the blade between a locked position and unlocked position) may be formed from Nitinol (nickel titanium). Nitinol provides shape memory that allows the material to undergo deformation at one temperature, stay in its deformed shape when the external force is removed and recover its original undeformed shape when heated above its transformation temperature. The Nitinol element is configured to change shape upon heating through application of a current. For example, a Nitinol wire or spring may be compressed when an electrical current (heat) is applied to disengage a coupled blade from the external threads of the stud and unlock the fastener, as described below. It is to be understood that Nitinol is provided as one example and other suitable shape memory alloys may also be used.

Figure 5:
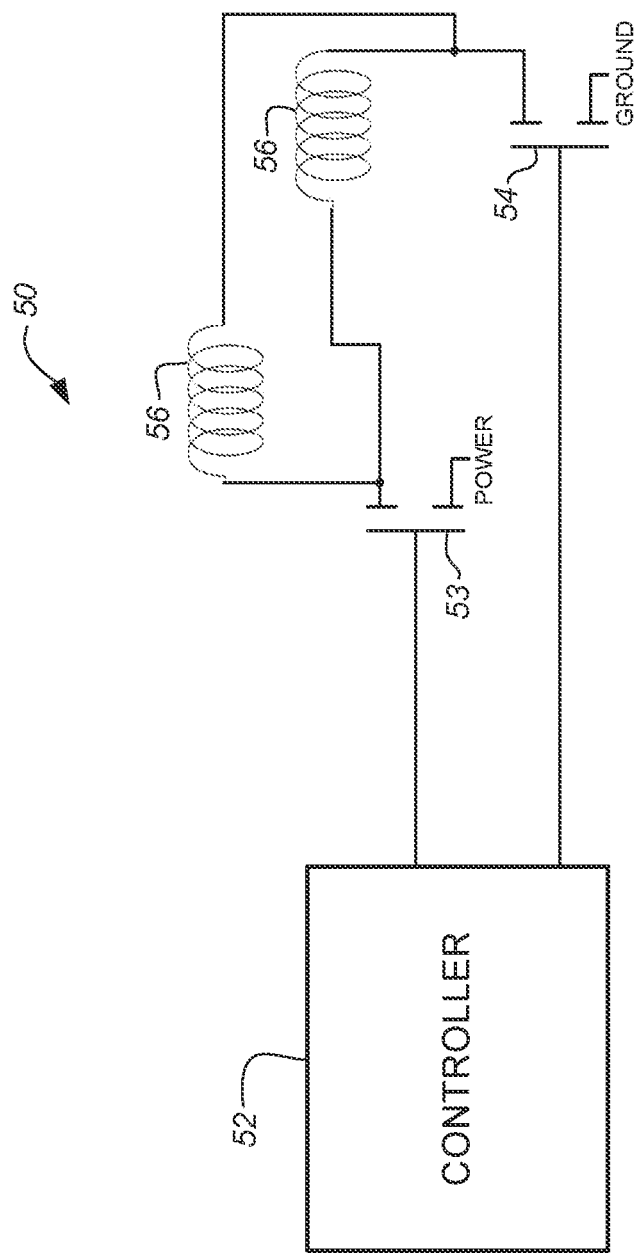
FIG. 5 is a simplified electrical circuit illustrating electrical connections between a controller and electrical springs, in accordance with one embodiment.

FIG. 5 is a simplified electrical circuit, generally indicated at 50, comprising a controller 52 (authentication module, lock controller) electrically coupled to a locking device comprising two electrically controlled springs 56, in accordance with one embodiment. The circuit 50 comprises a power and ground connection coupled to switches (FETs) 53, 54. The FET is interposed between the controller 52 and the locking device (electric springs 56) for transmitting a current to the locking device. As described below, the locking device may comprise the electrically controlled spring in contact with a blade or any arrangement of one or more spring, blade, wire, actuator (electromechanical plunger), piezo-electric cell, or other mechanism that operates to define the locking device. As previously noted, the electrically controlled spring may comprise a Nitinol wire. Heating of the Nitinol wire may be activated using a low voltage DC power supply. Since DC current may not heat the wire evenly, PWM (Pulse Width Modulation) may be used to heat the wire more evenly in one or more embodiments.

Figure 6:
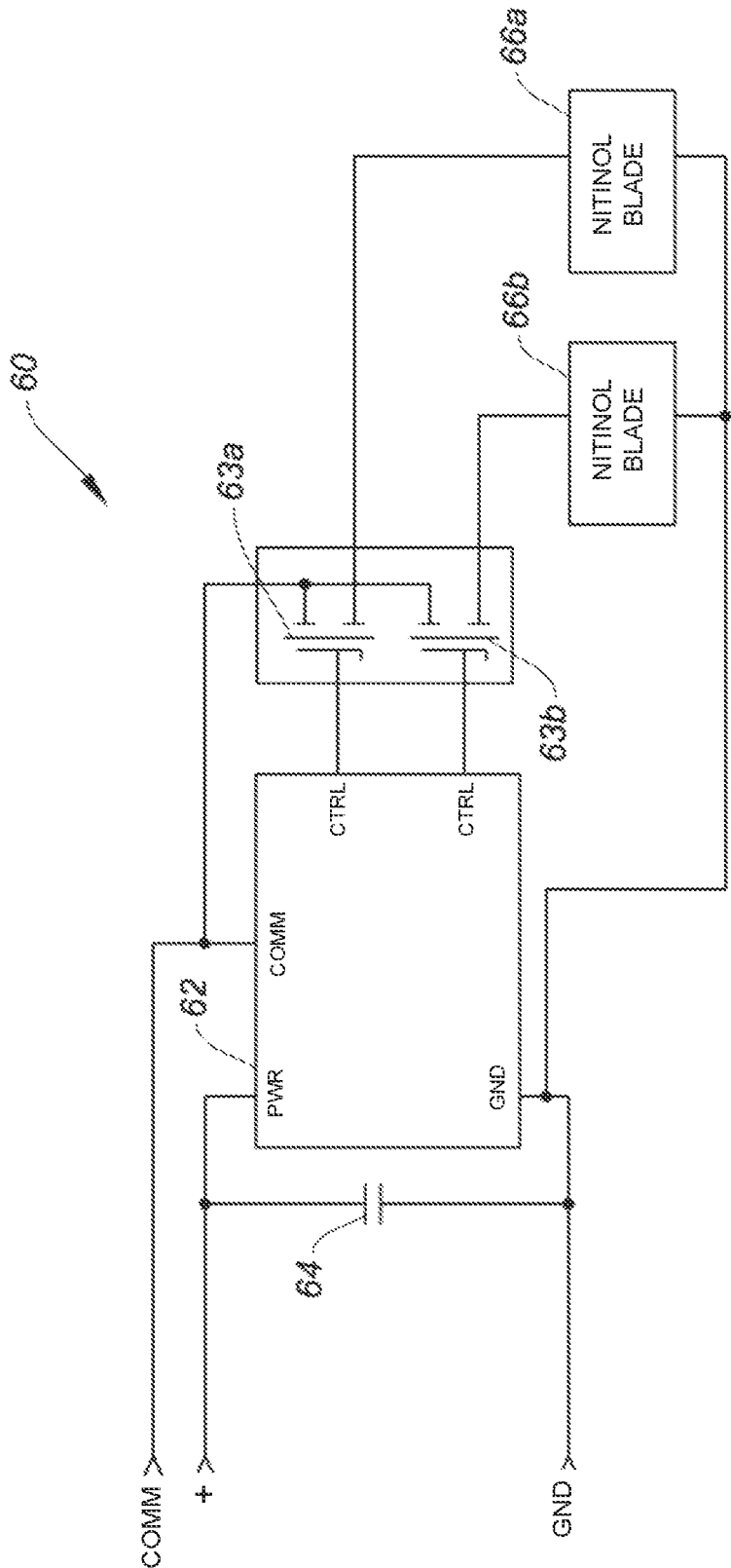
FIG. 6 is another example of an electrical circuit connecting the controller with locking members, in accordance with one embodiment.

FIG. 6 is another example of an electrical circuit, generally indicated at 60, that may be used to control Nitinol blades 66a, 66b (or Nitinol elements coupled to blades) through FETs 63a, 63b, respectively. The blades 66a, 66b may be configured for engagement with threads of the fastener to lock the fastener in place. The circuit 60 includes a power connection (+, ground) and a communications (data) connection coupled to controller 62 (e.g., security device, public or private encryption device, authentication module, lock controller). The communications and power (+) may be provided through the same contact point (power and data communications interface) and the nut surface may provide a ground contact point if it is a non-conductive surface, as previously noted. A capacitor 64 may be included for holding a charge after receiving power (e.g., up to one second or up to five seconds with surface contact). The stored charge may be used with a surface contact point that may intermittently move away from the power source (e.g., during rotation of the nut). In the example shown in FIG. 6, the controller 62 provides input to two Nitinol blades 66a, 66b through two FETs 63a, 63b. In another example, one FET driver may power both Nitinol blades, however, the use of dual FETs provides additional security.

Figure 7:
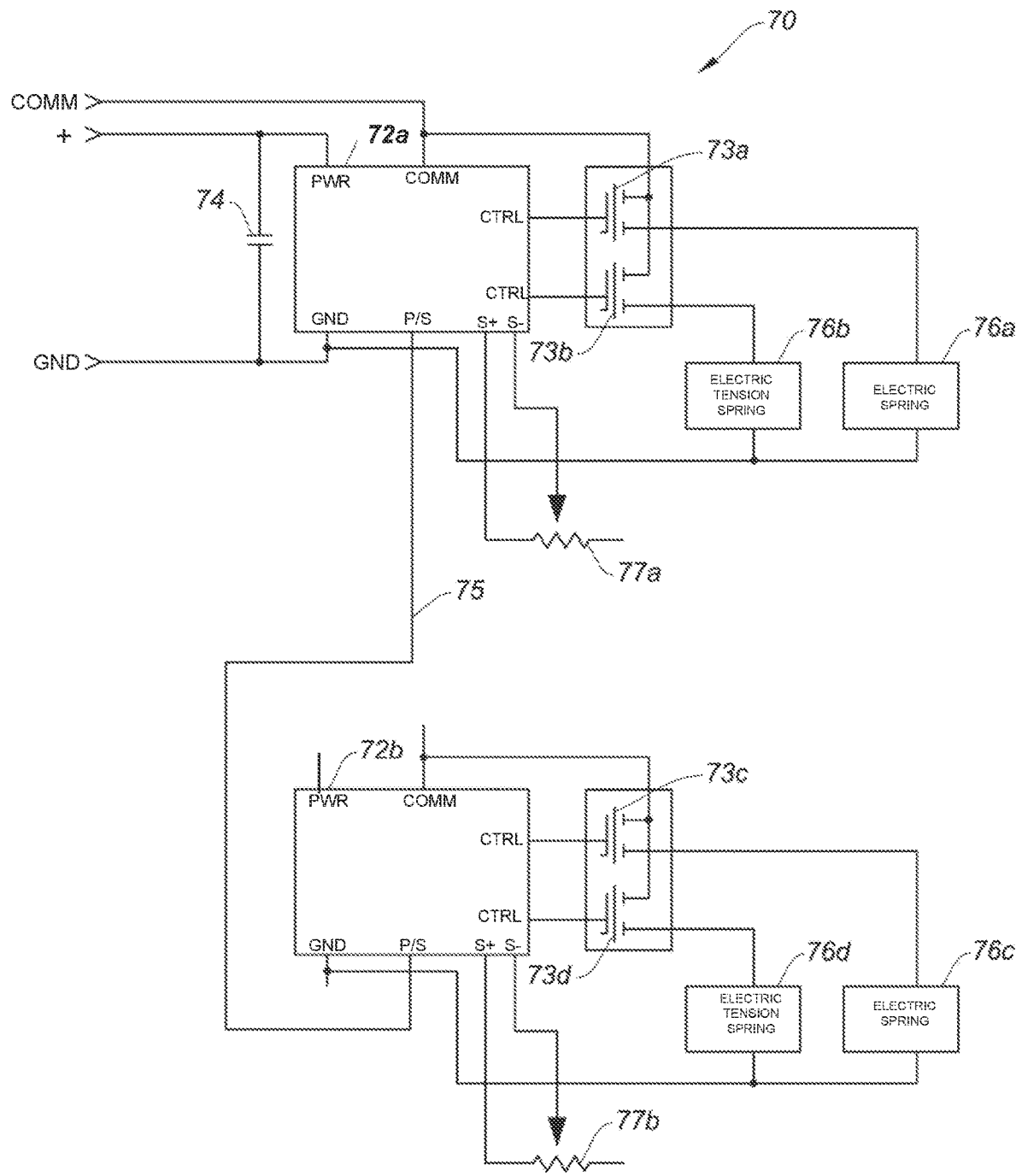
FIG. 7 is an electrical circuit comprising primary and secondary controllers and respective locking members, in accordance with one embodiment.

FIG. 7 is a schematic of an electrical circuit, generally indicated at 70, with a dual control block comprising primary controller 72a and secondary controller 72b, in accordance with one embodiment. In addition to the power and communications (comm) input, the controllers 72a, 72b are coupled through primary/secondary (P/S) link (control wire) 75 connecting the two control blocks. In this example, each control block 72a, 72b controls two electrical springs (electric springs 76a, 76c, electric tension springs 76b, 76d). The circuit shown in FIG. 7 also includes movement sense resistors 77a, 77b for identifying movement of the locking device (e.g., blade) at each controller 72a, 72b. A hold-up capacitor 74 is also shown in FIG. 7 for temporarily holding a charge, as previously described.

Figure 8:
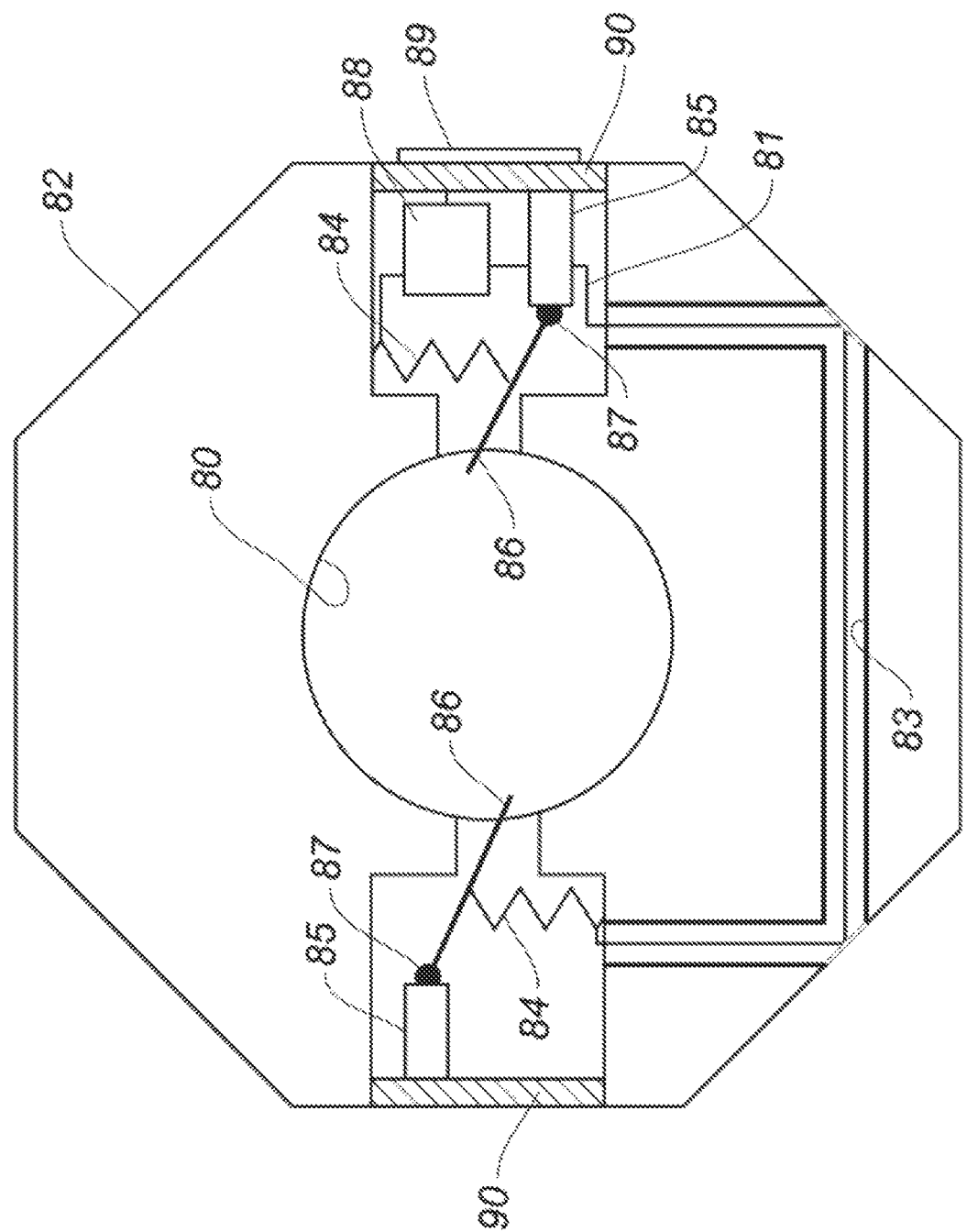
FIG. 8 is a cross-sectional view of a nut taken along line 8-8 in FIG. 4 illustrating an authentication module and locking device, in accordance with one embodiment.

FIG. 8 is a cross-sectional view of a nut 82 taken along line 8-8 in FIG. 4, in accordance with one embodiment. The nut 82 includes an opening 80 for receiving a stud, as described above with respect to FIGS. 1 and 4. In the example shown in FIG. 8, a single authentication module (controller) 88 is inserted on one side of the nut (right side as viewed in FIG. 8) and receives power and communications at a power and communications interface 89. The authentication module 88 is coupled to an electrical spring 84 (e.g., Nitinol wire) coupled to blade 86 and configured to move the blade away from the external threads of the stud to unlock the fastener. The blade 86 is held in place against a member 85 (e.g., spring or compressible member) upon which a hinge point 87 of the blade is defined. The authentication module 88 also controls another blade 86 through electrical spring 84 positioned on an opposite side of the nut 82. A control wire 81 extends from one side of the nut to the other side through interconnected drilled passageways 83, which may be sealed after drilling.

When the nut 82 is locked (power removed), the blades 86 are in contact with the stud at opening 80. The blades 86 are positioned to allow the nut to freely rotate onto the stud without power but prevent rotation in the opposite (loosening, uncoupling) direction. When the current is switched on (e.g., through FETs as previously described) the Nitinol wire 84 heats up quickly, contracts, and pulls the blade 86 downward on the left and upward on the right (as viewed in FIG. 8) to allow the nut to be rotated in a direction to remove the nut from the stud. When power is removed, the Nitinol wire cools, allowing the spring 84 to elongate and return to its initial position. The spring 84 may be a coiled Nitinol wire, a straight Nitinol wire, or a straight Nitinol wire coupled to a spring, for example. The opening into which the authentication module 88 and locking device (spring 84, blade 86) are inserted may be sealed with epoxy or an end cap 90 inserted after installation of components in the nut 82. The end cap 90 on the right may include a drilled passage for a wire coupling the interface 89 to the authentication module 88.

It is to be understood that the arrangement of components within the nut, or locking system components may be different than shown, without departing from the scope of the embodiments. FIGS. 9A-13 illustrate additional configurations of locking devices and control systems, but it is to be understood that these are only examples and various arrangement of components and types of locking devices may be used.

In one or more embodiments, the locking device may be configured with a fail-safe arrangement to prevent unlocking of the fastener assembly without proper authentication. FIG. 9A is a side view of the blade 86 and spring (compressible member 85). In this example, a non-conductive adhesive 91 is positioned adjacent to the blade 86. The adhesive 91 may be configured to lock the blade in its locked position (e.g., adhere blade 86 to nut or prevent movement about the blade hinge point 87) if the nut is exposed to high temperatures (e.g., 1.5 times the state change temperature of the Nitinol material). If the fastener assembly is exposed to a high temperature, rather than failing in the unlocked position, the blade will remain in the locked position. It is to be understood that this is only an example and a different type of fail-safe mechanism may be used for locking the nut in place upon failure of the locking device or heating of the fastener assembly to prevent tampering or failure in the unlocked position.

Figure 9B:
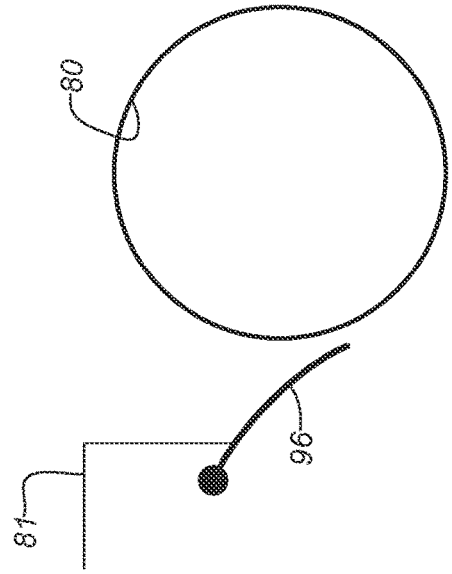
FIG. 9B is a top view illustrating a sensor for detecting movement of the blade, in accordance with one embodiment.

FIG. 9B illustrates the addition of a spring 92 coupled to a movement sensor 93. As the blade 86 moves (due to contraction of Nitinol wire 84) the spring 92, which is coupled at one end to the blade 86 and the other end to the sensor 93, indicates movement of the blade 86. The sensor 93 may send a signal over wire 94 to the controller to identify movement of the blade 86. It is to be understood that this is only an example and other types of sensors (e.g., resistive sensors) for detecting movement of the locking device may be used without departing from the scope of the embodiments.

Figure 9D:
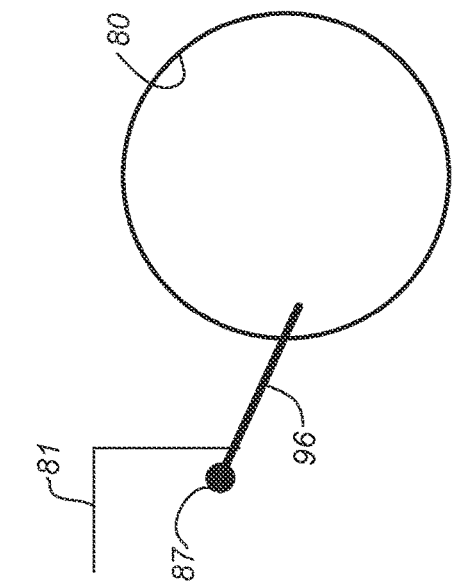
FIG. 9D is a top view of the Nitinol blade of FIG. 9C in an unlocked position.
Figure 9A:
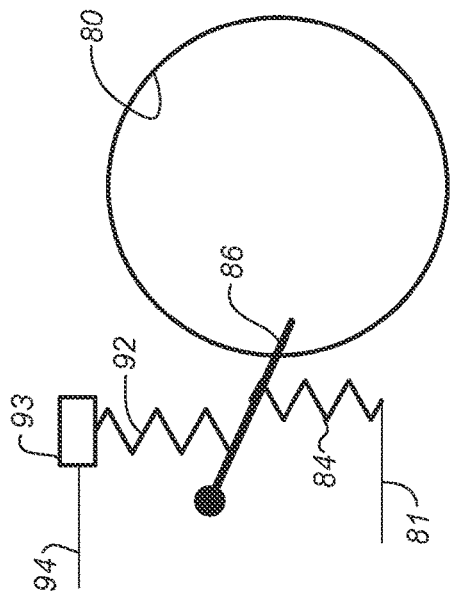
FIG. 9A is a side view of a blade of the locking device shown in FIG. 8 coupled to an adhesive failure point, in accordance with one embodiment.
Figure 9C:
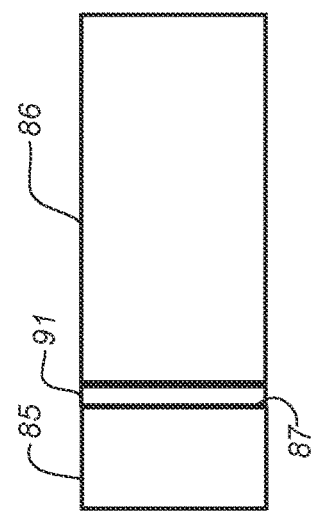
FIG. 9C is a top view of a Nitinol blade in a locked position, in accordance with one embodiment.

FIGS. 9C and 9D illustrate an example in which a Nitinol blade 96 is configured with an initial straight (locked) position shown in FIG. 9C. With a current applied to the Nitinol blade 96, the blade bends away from the stud in opening 80 to unlock the fastener. Upon removal of the current, the blade 96 cools and returns to its initial position (FIG. 9C). As previously noted, these are only examples and other arrangements of springs, blades, sensors, or other locking members may be used without departing from the scope of the embodiments.

Figure 11:
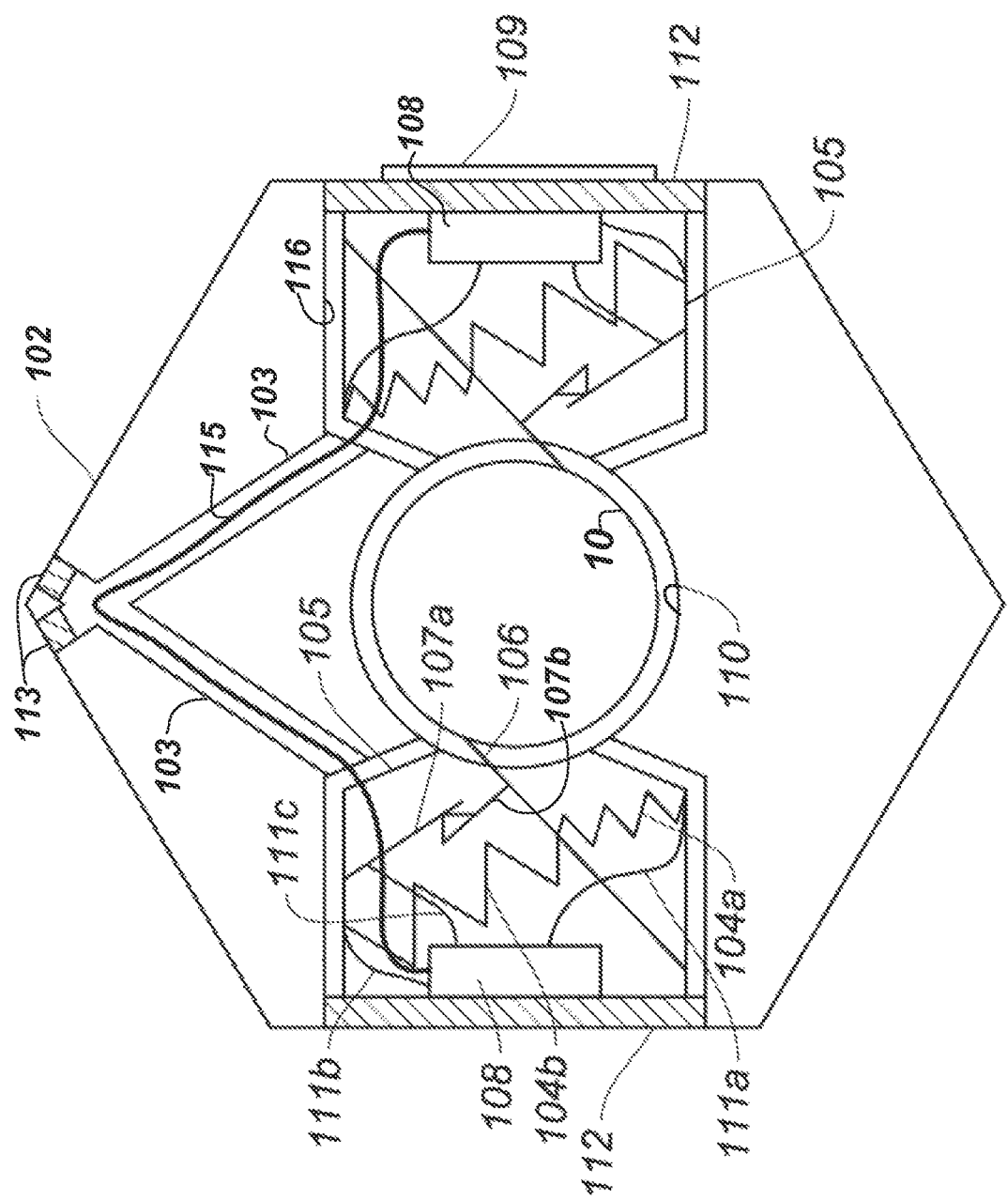
FIG. 11 is an assembled view of the nut and control assemblies of FIG. 10.

FIG. 10 is a cross-sectional view of a nut 102 taken along line 10-10 in FIG. 4 and a control assembly 105 for insertion into the nut. As shown in the assembled view of FIG. 11, two control assemblies 105 are inserted into opposite sides of the nut at openings 116, but for simplification only one control assembly is shown in FIG. 10. Each of the control assemblies 105 comprises a locking device and at least one of the control assemblies comprises an authentication module 108. In this example, each of the control assemblies 105 comprises the authentication module 108, one defined as the primary controller and the other defined as the secondary controller. The primary and secondary controllers 108 may be coupled through a primary/secondary control wire 115 as described above with respect to FIG. 7, which may be routed through two drilled passages 103. Power and communications interface 109 is coupled to the primary controller 108. As shown in FIG. 11, after the control assemblies 105 are installed, an epoxy cap 112 may be inserted to seal and protect the assembly from harm or intrusion. End caps 113 may also be inserted into the drilled passages 103 containing control wire 115.

Each control assembly 105 comprises an authentication module (primary or secondary controller 108) electrically coupled to springs (electrical spring or wire, tension spring) 104a, 104b connected to blade 106. The springs receive current through wires 111a, 111b and are arranged to work together to move a blade 106 from its locked position to its unlocked position. In one example, spring 104b may comprise a tension spring providing a counterbalance when spring 104a creates tension at the spring. When power is applied to the springs 104a, 104b, the blade 106 moves away from external threads of the stud, thereby unlocking the fastener assembly. A movement sensor (e.g., resistive device) 107a senses movement of the blade 106 through a link 107b providing an input based on movement of the blade to controller 108 through wire 111c. FIG. 11 illustrates engagement of the blades 106 against the fastener 10. For simplification, threads are not shown at the opening 110 or fastener 10. As previously noted, the arrangement of springs and blades shown in FIGS. 10 and 11 is only an example and any suitable arrangement of Nitinol wires and springs (electric or mechanical springs) and blade may be used to provide movement of the blade (or other element) from its locked position to its unlocked position upon application of a current (heat) to one or more heat activated wires.

It is to be understood that the locking devices shown and described herein are only examples and other configurations may be used, without departing from the scope of the embodiments. For example, the locking member may be controlled with magnetics, solenoid operated devices (actuators, springs), piezo-electronics, or other electromechanical devices.

Figure 12:
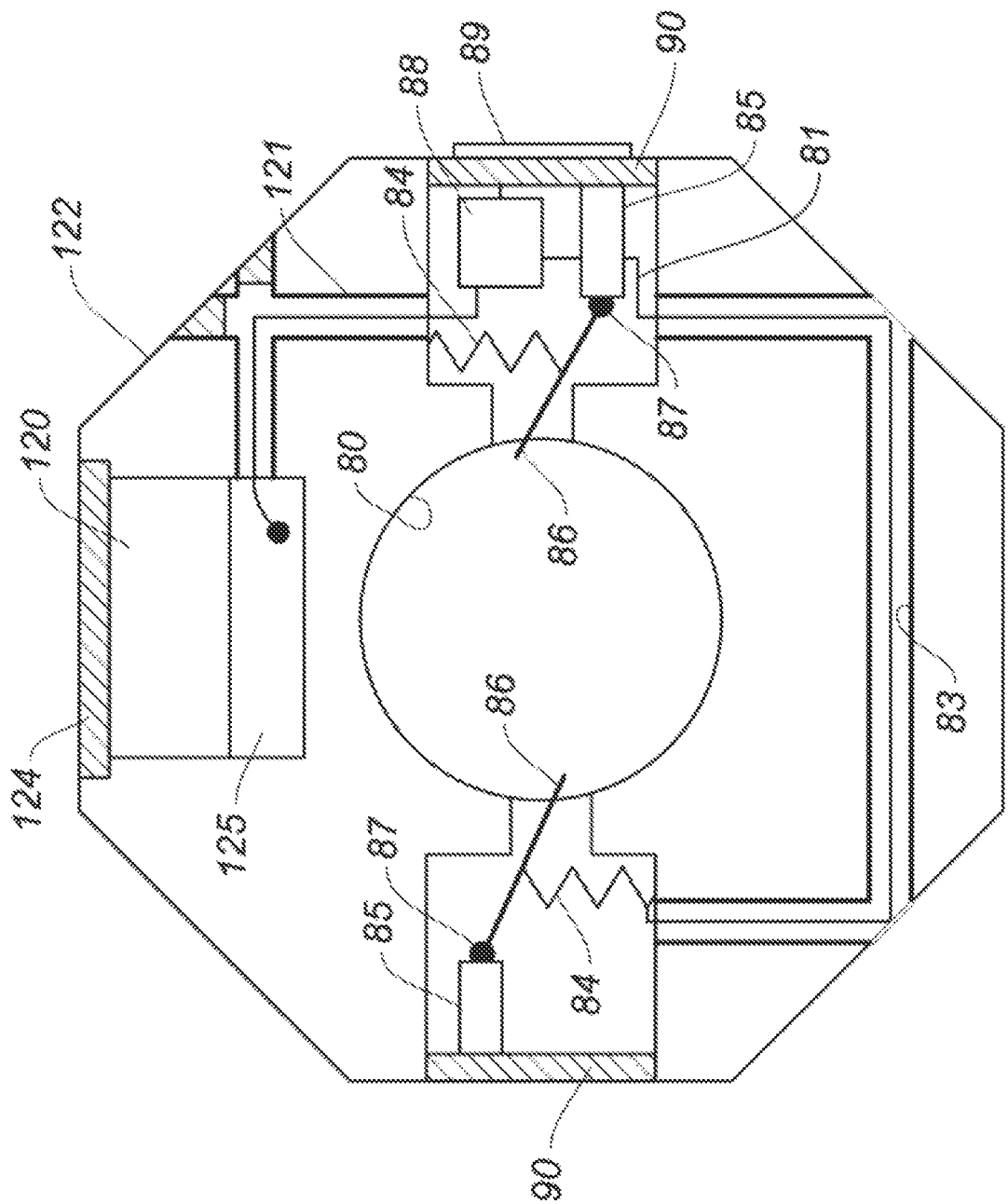
FIG. 12 is a cross-sectional view of a nut taken along line 8-8 in FIG. 4 illustrating a battery operated and wireless controlled authentication module and locking device, in accordance with one embodiment.
Figure 13:
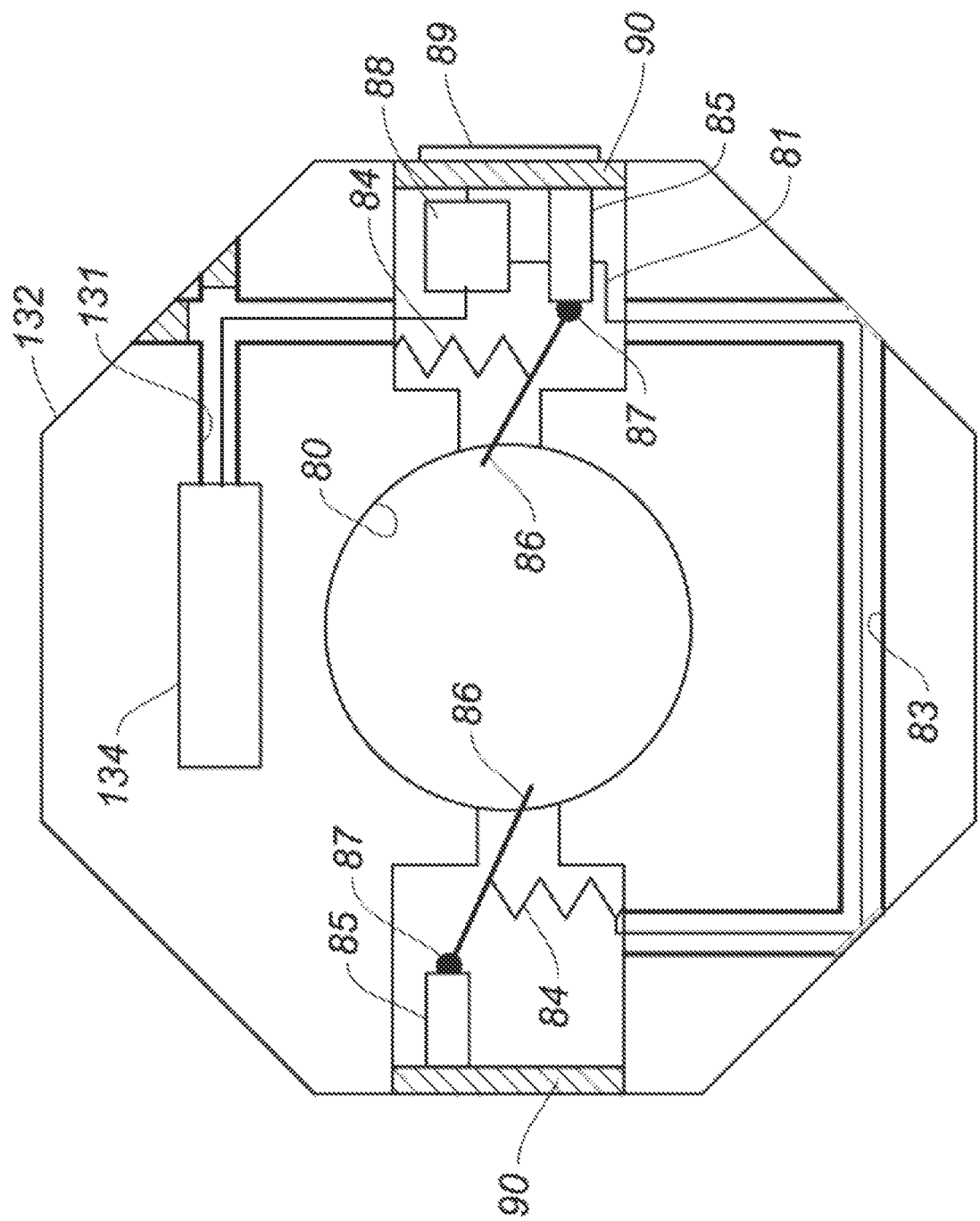
FIG. 13 is a cross-sectional view of a nut taken along line 8-8 in FIG. 4 illustrating a direct contact controlled authentication module and locking device, in accordance with one embodiment.

FIGS. 12 and 13 illustrate systems for wireless authentication and direct contact authentication, respectively. In one or more embodiments, the systems may provide a direct feedback loop so if tampering occurs without authentication approval, the central system (e.g., CPU (Central Processing Unit)) may raise an alarm. For example, if the CPU senses that a nut has been removed from a fastener without authorization, an alarm may be initiated. For the embodiments shown in FIGS. 12 and 13, power and communications are received from an external source other than the tool, therefore any standard tool may be used to remove the nut (uncouple fastener assembly).

Referring first to FIG. 12, a nut 122 is shown comprising the authentication module 88 controlling electrical springs 84 coupled to the blades 86, as described above with respect to FIG. 8. The power and communications interface 89 is shown in this example, but the interface is optional and may be removed. Power is received from battery 120 and communications are received at wireless interface 125, which may comprise a Bluetooth module or other wireless interface operating according to any suitable protocol. A drilled passageway 121 is provided to couple the battery 120 and wireless interface 125 to the authentication module 88. The battery 120 and wireless interface 125 may be covered with a removable cap or seal 124 for ease of replacement.

FIG. 13 shows a nut 132 comprising a power and communications interface 134 positioned on a bottom surface (face) of the nut in direct contact with a mounting surface comprising a mating interface, as described below with respect to FIG. 14. Power and communications are provided to the authentication module 88 through drilled passages 131. The power and communications interface 134 may comprise one or more contact point as described below with respect to FIG. 14. As noted above with respect to FIG. 12, the power and communications interface 19 located on the side of the nut may be removed from this embodiment or provided as a backup method for unlocking the fastener assembly.

FIG. 14 illustrates two fastener assemblies each comprising a fastener 140 (e.g., stud) and nut 142. The nut 142 receives power and communications from mating structure (surface 141) at contact points 144. The fastener assemblies may be used, for example, to securely mount a network device (e.g., server blade, Wi-Fi or cellular module, router, or other network component or subsystem) 138 to a structure (e.g., frame or support in electric vehicle). The surface 141 shown in FIG. 14 may comprise a mounting bracket connected to the network device and the fastener assemblies may lock the network device in place on a supporting structure. The locked fastener assembly prevents, for example, removal of a server blade from an electric vehicle without proper authorization, which may be provided through direct control from a controller (security and communications system 145) at the network device 138.

FIG. 14 illustrates power and communications wires 143 transmitting power and communications to the contact points 144 on surface 141 for transmitting power and communications to the interfaces on a bottom face of the nut 142. Multiple contact points may be used to maintain power during spin-off time of the nut. In the example shown in FIG. 14 two contact points 144 are provided for each nut 42 to reduce the time period between power application as the nut rotates. As previously described, a capacitor (super capacitor) may be included in the circuit so that the nut is able to hold a charge as the nut is rotated or moved away from the surface 141. In one example, the contacts points (or interface at the surface) may be spring loaded so that the interface remains in contact with the nut as it moves away from the mounting surface. In another example, a user has access to the fastener, which is rotated relative to the nut so that the nut remains flush against the mounting surface as the fastener is removed.

The authentication module at the fastener assembly receives power and communications through the contact point 144 from a security system at the network device. The network device 138 includes one or more processor 147 (e.g., CPU), memory 146 (local or cloud storage), security and communications systems, authentication module (controller) 149, and power supply 144. In the example shown in FIG. 14, the CPU 147 is in communication with memory 146 and FPGA (Field-Programmable Gate Array) 148 or other integrated circuit. The FPGA 148 is in communication with the authentication module 149 and security/communications system 145.

Memory 146 may be a volatile memory or non-volatile storage, which stores various applications, operating systems, modules, and data for execution and use by the processor. The device may include any number of memory components.

Logic (software, firmware, control logic, code) may be encoded in one or more tangible media for execution by the processor 147. For example, the processor 147 may execute codes stored in a computer-readable medium such as memory 146. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. In one example, the computer-readable medium comprises a non-transitory computer-readable medium. The network device 138 may include any number of processors.

It is to be understood that the network device 138 shown in FIG. 14 and described above is only an example and that different configurations of network devices (with more or fewer components) may be used. For example, the network device may further include any suitable combination of hardware, software, algorithms, processors, devices, components, or elements operable to facilitate the capabilities described herein.

Figure 15:
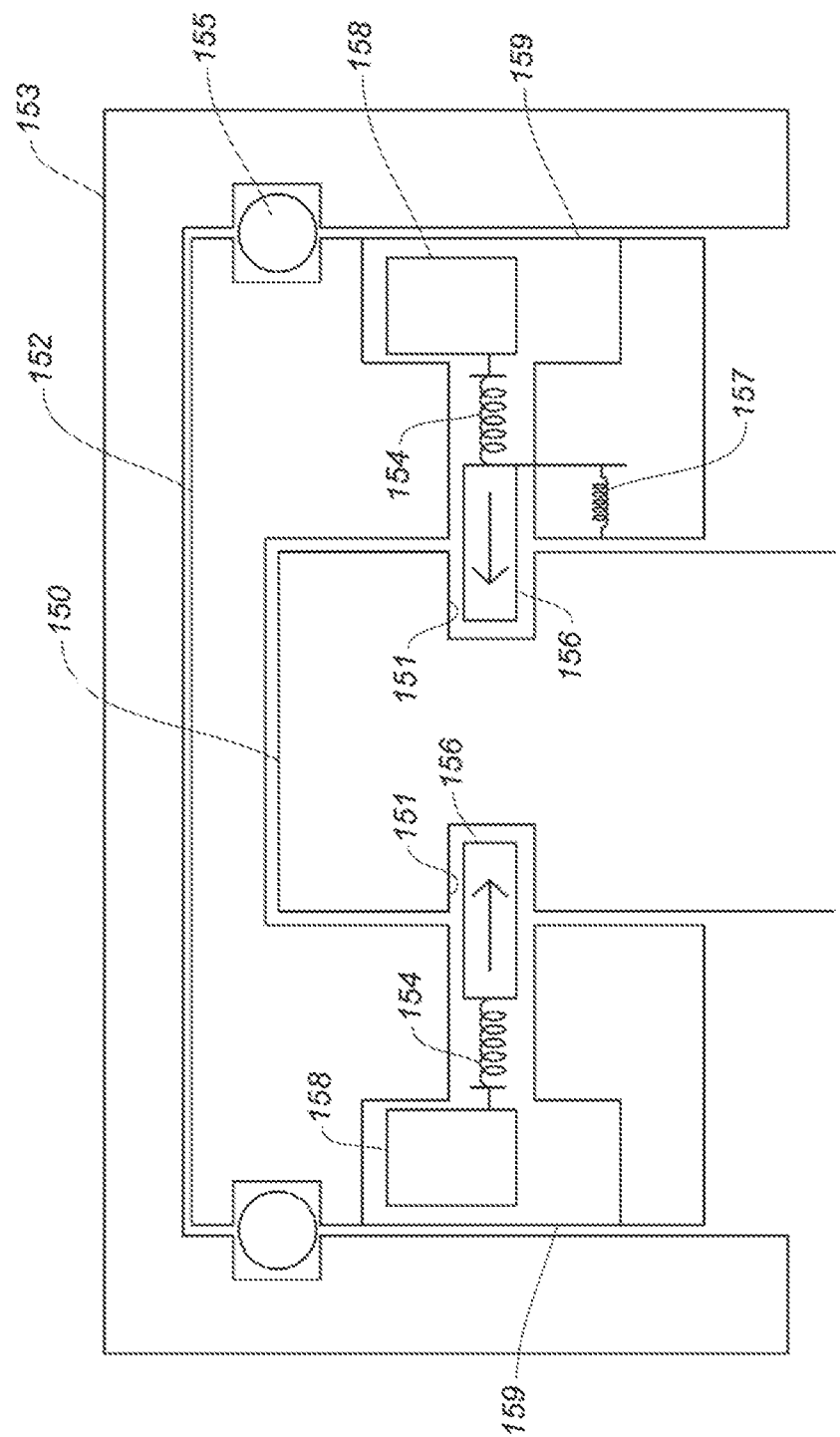
FIG. 15 is a cross-sectional view of a non-threaded mechanical fastener assembly, in accordance with one embodiment.

FIG. 15 illustrates a fastener assembly comprising an unthreaded fastener (shaft, stud, pin, card) 150 and nut (cap, inner shell) 152, in accordance with one embodiment. The fastener 150 comprises grooves 151 for receiving pins 156 of the locking device. The nut 152 includes an opening for slidably receiving the fastener 150. The upper end of the fastener 150 may be tapered to allow the fastener to freely slide into the receiving member (nut) 152 with the locking members 156 in their locked (extended) position. The nut 152 comprises authentication modules 158 and a locking device comprising springs 154 and locking members 156. In the example shown in FIG. 15, two authentication modules 158 are shown, but as previously described only one authentication module may control both locking members. The authentication modules 158 may be in communication through one or more wires passing through drilled passages (not shown), as previously described. The authentication module 158 is electrically coupled to the electrical spring 154, which may comprise a Nitinol wire that compresses when a current is applied to pull the locking member 156 away from the groove 151 and disengage the locking member from the fastener 150 to unlock the nut 152 from the fastener. In the example shown in FIG. 15, another Nitinol spring 157 is provided to force the locking member 156 in its locked position in case of a failure at the electrical spring 154 or if heat is applied to the fastener assembly, resulting in heating of both springs 154 and 157. Electrical spring 154 is configured to overcome the force of spring 157 when an electrical current is applied to the wire of spring 154 during normal operation. If heat is applied to the springs 154 and 157, both of the springs are active and the force applied by spring 157 is greater than the compressive force of spring 154 and the locking member 156 remains engaged.

It is to be understood that the arrangement of locking members 156 and springs 154, 157 shown in FIG. 15 is only an example and other locking mechanisms may be used including the blade spring arrangement previously described, with the blade members received in grooves in the fastener to prevent uncoupling of the fastener assembly without proper authorization.

In the example shown in FIG. 15, a rotatable (outer) shell 153 is mounted on (placed over) the nut 152 with a roller bearing 155 (or split ring) allowing the outer shell to freely rotate relative to the nut 152. Power and communications may be provided through a direct contact or wireless interface (not shown) as previously described.

The fastener 150 shown in FIG. 15 may comprise any slidable member (e.g., cylindrical, rectangular) comprising one or more grooves 157 for receiving one or more locking members 156. For example, the receiving member 152 may comprise a structure with integrated authentication module and locking member positioned adjacent to a slot for receiving a component such as a card (e.g., memory card, line card) to securely lock the card in place and prevent removal without proper authorization.

Figure 16:
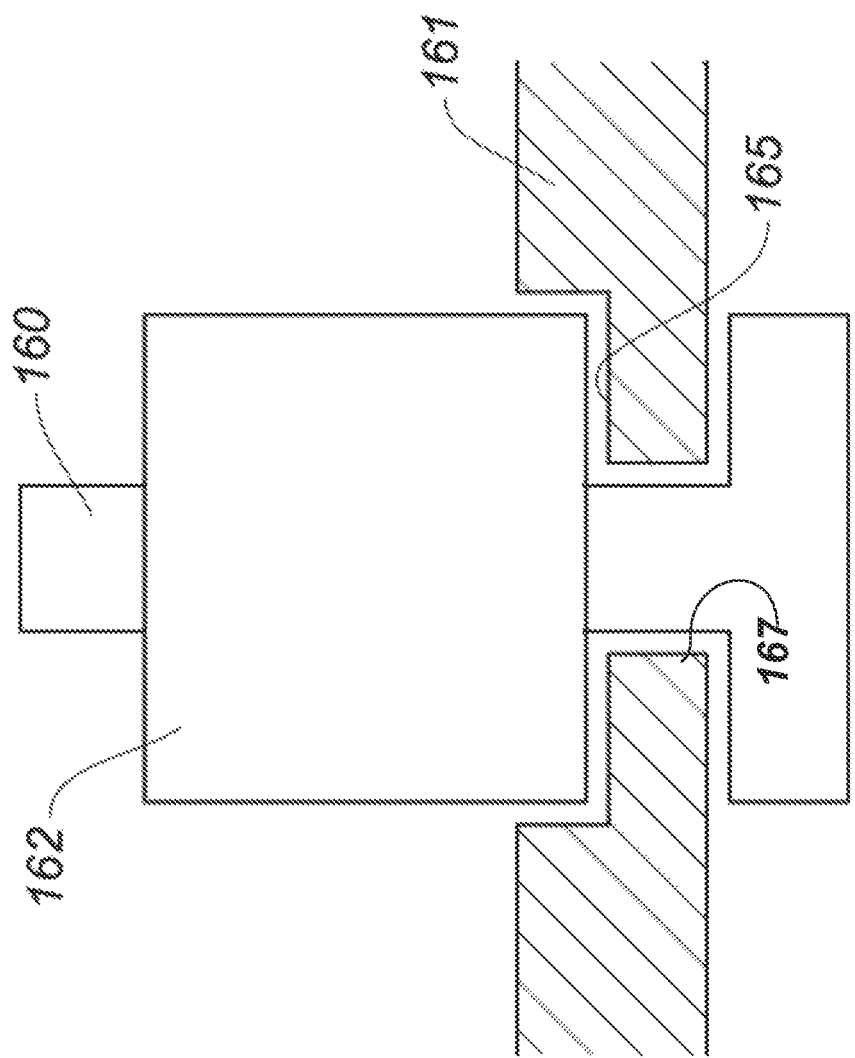
FIG. 16 is a side view of a fastener assembly installed in a tamper resistant structure, in accordance with one embodiment.

FIG. 16 illustrates a fastener assembly comprising a bolt 160 received in a nut 162 comprising an integrated authentication module and locking device, as previously described. In order to prevent physical tampering with the fastener assembly, a groove (flange) 165 is formed in an upper surface of a mounting structure 161 so that at least a portion of the nut 162 is received in the groove to prevent insertion of a tool under the nut to physically force the locked nut off of the fastener 160. As shown in FIG. 16, the mounting structure 161 (mating brackets, frames, supports) comprises an opening 167 for receiving the first member (fastener) 160 and the flange 165 for receiving at least a portion of the second member (nut) 162 to prevent access to at least one face of the second member.

Figure 17:
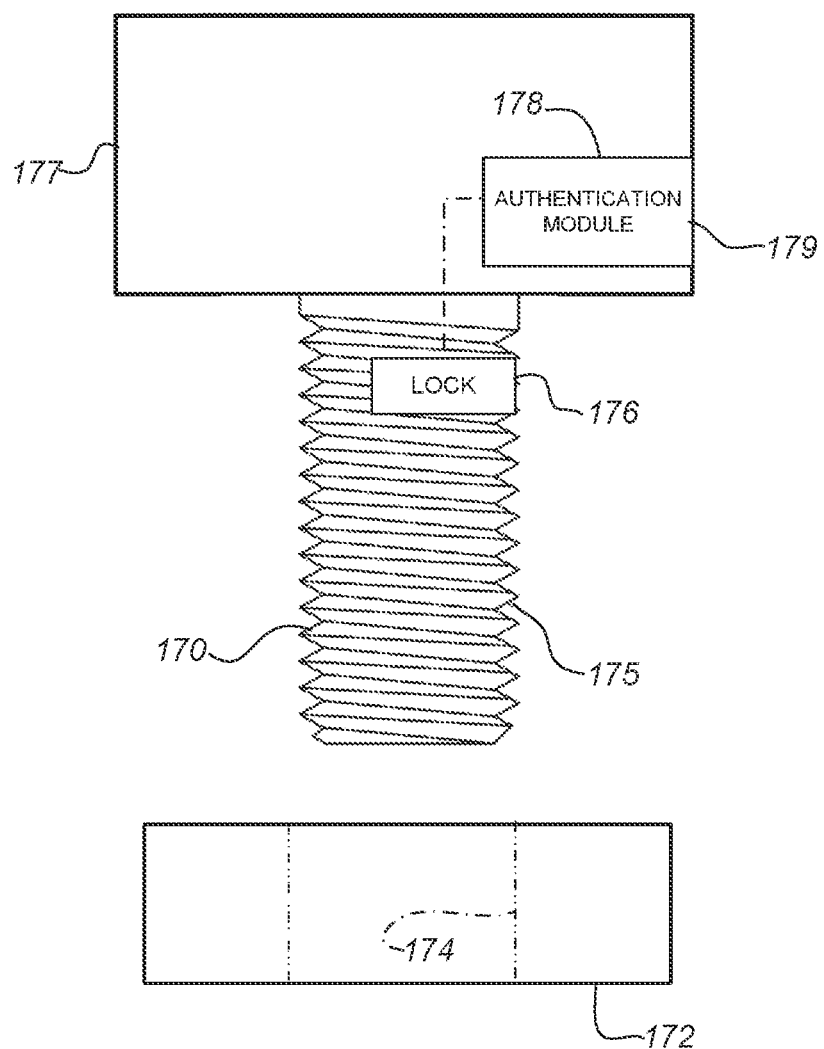
FIG. 17 is a front view of a mechanical fastener assembly with an electronic authentication module integrated into a fastener, in accordance with one embodiment.

FIG. 17 is a front view of a mechanical fastener assembly with an electronic authentication module 178 integrated into a fastener 170, in accordance with one embodiment. The fastener assembly comprises the fastener 170 (e.g., bolt) with external threads 175 and head 177 comprising the integrated authentication module 178. The external threads 175 of the bolt 170 are received in a nut 172 with internal threads on central longitudinal opening 174. The nut may be attached to a structure receiving the fastener. The authentication module 178 receives power and communications from external power and communications interface 179. The authentication module 178 is in communication with a locking device 176 to unlock the fastener assembly upon receiving a proper authentication code from a tool (e.g., wrench used to loosen bolt from nut 172), direct contact with a surface interposed between bolt head and nut, or a source in wireless communication with the authentication module 178. The locking device 176 may comprise for example, a ring, pin, blade, or other locking member operable to engage with the nut and prevent loosening of the nut until moved to its unlocked position. The bolt is free to rotate in a coupling direction with the locking device 176 engaged. The locking device may comprise an electrically controlled spring, blade, wire, or other mechanism, as previously described.

Figure 18:
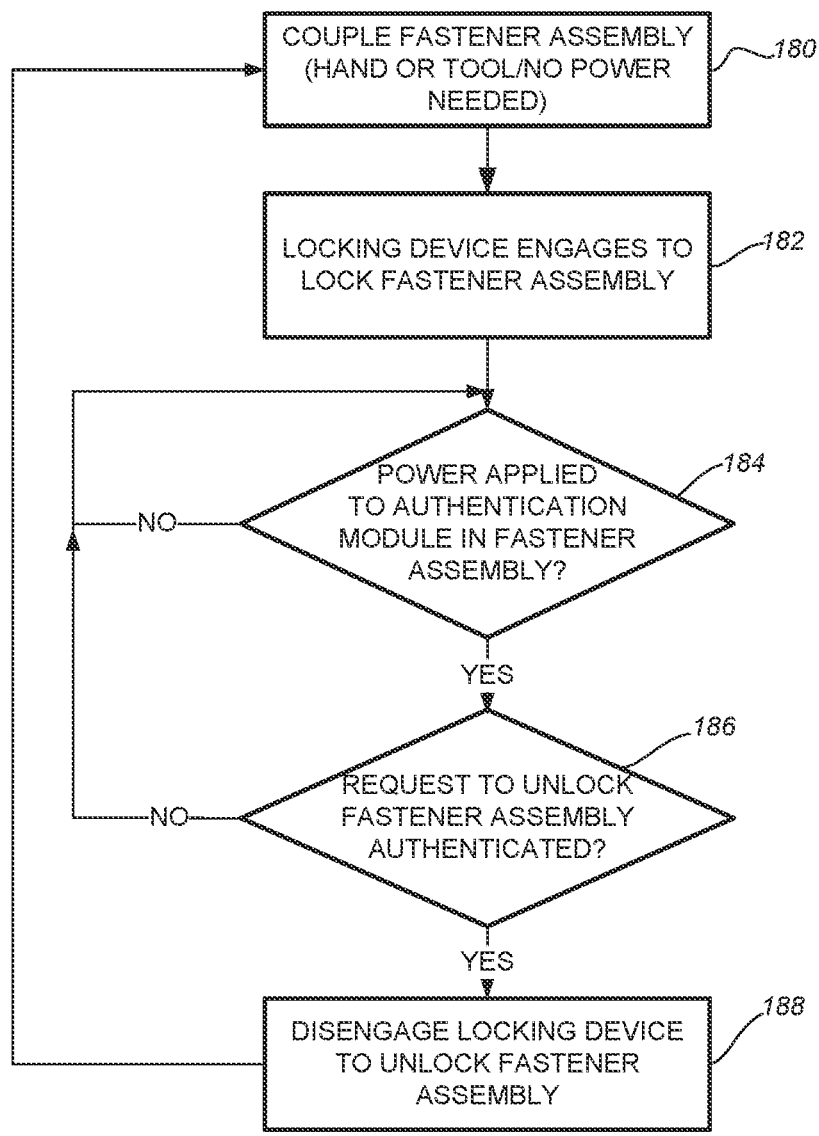
FIG. 18 is a flowchart illustrating an overview of a process for locking and unlocking the fastener assembly of FIG. 1 or FIG. 17, in accordance with one embodiment.

FIG. 18 is a flowchart illustrating an overview of a process for locking and unlocking the fastener assembly, in accordance with one embodiment. The fastener assembly (fastener/receiving member (structure), stud/nut, bolt/nut) is coupled at step 180. As described above, power is not needed to couple the fastener assembly so any tool may be used or the fastener or nut may be tightened by hand. The locking device (e.g., blade, pin) automatically engages to lock the fastener assembly once the fastener is inserted into the nut (step 182). Power and communications are received at the authentication module integrated into the fastener assembly (e.g., one of the fastener or the nut) (step 184). The authentication module authenticates a request to unlock the fastener assembly (step 186) and disengages the locking device to unlock the fastener assembly (step 188). As previously described, the authentication module provides input to the locking device, which may comprise, for example, a signal to a switch (FET) to provide current to a Nitinol element. Application of current (heat) to the Nitinol element causes the element to change shape and unlock the locking device.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. An apparatus comprising:
an opening for receiving a fastener;
a locking device operable to engage with the fastener to prevent uncoupling of the apparatus and the fastener; and
an authentication module in communication with the locking device and operable to disengage the locking device from the fastener upon receiving power and authenticating a request to uncouple the apparatus and fastener.

2. The apparatus of claim 1 wherein the apparatus comprises a nut and the fastener comprises a threaded member for insertion into the nut.

3. The apparatus of claim 2 wherein the locking device comprises a blade for engagement with threads of the threaded member with the locking device in a locked position to prevent rotation of the fastener or the nut in a direction that uncouples the fastener and the nut.

4. The apparatus of claim 1 wherein the fastener comprises an unthreaded shaft with a grove for receiving a pin of the locking device.

5. The apparatus of claim 4 further comprising a rotatable shell mounted on the apparatus.

6. The apparatus of claim 1 wherein the locking device comprises a Nitinol element configured to change shape upon application of a current.

7. The apparatus of claim 6 wherein the Nitinol element comprises a spring.

8. The apparatus of claim 6 wherein the Nitinol element comprises a blade configured for engagement with threads of the fastener to lock the fastener in place.

9. The apparatus of claim 1 further comprising a power and communications interface located on an external surface of the apparatus for receiving power and data.

10. The apparatus of claim 9 wherein the external surface comprises a side of the apparatus for contact with a mating interface on a tool configured to unlock the fastener.

11. The apparatus of claim 9 wherein the external surface comprises a face in contact with a mounting surface comprising a mating interface.

12. The apparatus of claim 11 further comprising a capacitor for holding a charge after receiving power from the mating interface.

13. The apparatus of claim 9 wherein the power and communications interface comprises a wireless interface.

14. The apparatus of claim 1 further comprising a FET (Field-Effect Transistor) interposed between the authentication module and the locking device for providing current at the locking device.

15. The apparatus of claim 1 wherein the locking device comprises at least two locking members in communication with the authentication module.

16. The apparatus of claim 1 further comprising a sensor for detecting movement of the locking device.

17. The apparatus of claim 1 further comprising a failure prevention device for locking the fastener in place upon failure of the locking device.

18. An apparatus comprising:
a first member;
a second member configured for coupling with said first member;
an authentication module integrated into one of said first member or said second member; and
a locking device operable to lock said second member to said first member, wherein the locking device is operable to unlock said second member from said first member upon receiving an input from the authentication module;
wherein the authentication module is operable to authenticate an unlock request received from an external source.

19. The apparatus of claim 18 wherein said first member comprises a threaded fastener and said second member comprise a nut.

20. The apparatus of claim 18 wherein movement in a coupling direction between said first member and second member is permitted with the locking device in a locked position and movement in an uncoupling direction is permitted only with the locking device in an unlocked position.

21. The apparatus of claim 20 wherein said movement comprises rotation.

22. The apparatus of claim 20 wherein said movement comprises a longitudinal sliding motion.

23. The apparatus of claim 18 wherein said first member comprises an unthreaded member with a grove for receiving a pin of the locking device.

24. The apparatus of claim 18 wherein the locking device comprises a Nitinol element configured to change shape upon application of a current.

25. The apparatus of claim 18 further comprising a power and communications interface for receiving power and data at said first member or said second member comprising the authentication module.

26. The apparatus of claim 18 wherein the locking device comprises two locking members each comprising an electric spring coupled to a blade.

27. The apparatus of claim 18 further comprising a mounting surface comprising an opening for receiving said first member and a flange for receiving at least a portion of said second member to prevent access to at least one face of said second member.

28. The apparatus of claim 18 wherein said first member comprises a slot for receiving said second member comprising a card, wherein the authentication module and the locking device are integrated into said first member for locking the card in place.

29. A method comprising:
    engaging a locking device to prevent uncoupling of a fastener assembly;
    receiving power and communications at an authentication module integrated into the fastener assembly;
    authenticating a request to unlock the fastener assembly at the authentication module; and
    disengaging the locking device to unlock the fastener assembly.

30. The method of claim 29 wherein the fastener assembly comprises a fastener and a nut and wherein the authentication module and the locking device are integrated into one of the fastener or the nut.

31. The method of claim 30 wherein the fastener is inserted into a frame of a network device to lock the network device to a structure.

32. The method of claim 30 wherein the fastener comprises a threaded shaft.

33. The method of claim 30 wherein the fastener comprises an unthreaded member slidingly received in the nut.

34. The method of claim 30 further comprising coupling the nut to the fastener to securely lock a network device to an electric vehicle without power applied at the authentication module.

35. The method of claim 30 wherein engaging the locking device comprises engaging locking members of the nut with the fastener when the fastener is inserted into the nut.

36. The method of claim 29 wherein disengaging the locking device comprises applying a current to a Nitinol element.

* * * * *